(12) United States Patent
Jilek et al.

(10) Patent No.: US 10,488,539 B2
(45) Date of Patent: Nov. 26, 2019

(54) INTERACTIVE IMAGE WEIGHTING BY ILLUMINATION IN SEISMIC IMAGING

(71) Applicant: BP Corporation North America Inc., Houston, TX (US)

(72) Inventors: Petr Jilek, Houston, TX (US); Jim Lin, Sugar Land, TX (US); Tongning Yang, Katy, TX (US)

(73) Assignee: BP Corporation North America Inc., Houston, TX (US)

( * ) Notice: Subject to any disclaimer, the term of this patent is extended or adjusted under 35 U.S.C. 154(b) by 140 days.

(21) Appl. No.: 15/287,016

(22) Filed: Oct. 6, 2016

(65) Prior Publication Data

US 2017/0108603 A1 Apr. 20, 2017

Related U.S. Application Data

(60) Provisional application No. 62/242,135, filed on Oct. 15, 2015.

(51) Int. Cl.
*G01V 1/34* (2006.01)
*G01V 1/36* (2006.01)

(52) U.S. Cl.
CPC .............. *G01V 1/362* (2013.01); *G01V 1/34* (2013.01); *G01V 2210/512* (2013.01)

(58) Field of Classification Search
USPC ......................................................... 367/68
See application file for complete search history.

(56) References Cited

U.S. PATENT DOCUMENTS

| 4,800,539 A * | 1/1989 | Corn ................... G01V 1/306 367/68 |
| 8,553,499 B2 | 10/2013 | Albertin et al. |
| 2015/0124559 A1 | 5/2015 | Cha |

FOREIGN PATENT DOCUMENTS

WO 20130134524 9/2013

OTHER PUBLICATIONS

Askim, O.J., Albertin,U., Matson, K., and Gherasim, M., 2010, Wave-equation-based illumination determination for AVA risk assessment: 80th Annual International Meeting, SEG, Expanded Abstracts, 3263-3267.
Gherasim, M,, Albertin, U., Nolte, B., Askim, O.J., Trout, M., and Hartman, K., 2010 Wave-equation angle-based illumination weighting for optimized subsalt imaging: 80th Annual International Meeting, SEG, Expanded Abstracts, 3293-3297.

(Continued)

*Primary Examiner* — Lam S Nguyen
(74) *Attorney, Agent, or Firm* — Robert Hsiao

(57) ABSTRACT

A method for use in seismic imaging a subterranean geological formation, includes: displaying a gather of seismic images, the seismic images being generated from a set of seismic data representative of the geological formation; interactively selecting an illumination band based on the degree of signal and noise separation in the seismic images; decomposing each of the seismic images of the gather into a partial image, each partial image defined in the seismic image by the selected illumination band; interactively selecting at least a portion of one or more of the partial images based on a predominance of signal; interactively weighting the selected portions relative to the predominance of signal; stacking the selected, interactively weighted portions; and displaying an image of the stacked, weighted portions.

13 Claims, 5 Drawing Sheets

(56) References Cited

OTHER PUBLICATIONS

Gherasim, M., Albertin, U., Nolte, B., Etgen, J., Vu, P., Jilek, P., Trout, M., and Hartman, K., 2012, Wave-equation angle-based illumination weighting study; Thunder Horse, Gulf of Mexico: 82nd Annual International Meeting, SEG, Expanded Abstract 1-5, DOI http://dx.doi.org/10.1190/segam2012-0183.1.

* cited by examiner

INTERACTIVE IMAGE WEIGHTING BY ILLUMINATION IN SEISMIC IMAGING

CROSS-REFERENCE TO RELATED APPLICATIONS

This application claims benefit of U.S. provisional patent application Ser. No. 62/242,135 filed Oct. 15, 2015, and entitled "Interactive Image Weighting By Illumination In Seismic Imaging" which is hereby incorporated herein by reference in its entirety.

DESCRIPTION OF THE INVENTION

Field of the Invention

The present invention pertains to seismic imaging and, more particularly, to a technique for prestack processing of seismic images to yield improved stacked image quality.

Background of the Invention

Costs for drilling hydrocarbon wells have become very high as efforts have begun focusing on deposits that are more difficult to locate and bring into production. A great deal of effort therefore goes into discovering likely locations of such hydrocarbon deposits. The process is generally referred to in the art as seismic or geophysical exploration. Seismic exploration is, and always has been, a highly technological art. This is because one cannot directly observe the Earth's subsurface at the desired scale to make such exploration fruitful, and so the art uses various technologies to indirectly observe the subsurface. The technological aspect of this art is evident both in the manner in which the seismic data are acquired and in the nature in which it is processed to provide useful information regarding the presence and location of hydrocarbons.

Seismic exploration typically involves imparting seismic signals into the ground where they propagate through the subsurface geological formations. Each seismic signal is actually a wavefront of energy that travels through a swathe of the formation. As the wavefront passes through the formation, various features of the formation affect the propagation path of the wavefront in characteristic ways. At least a part of the wavefront's energy is eventually returned to the surface where it is recorded as raw data. The raw data are typically referred to as "seismic data" and, because of the characteristic manner in which features of the formations affect the energy, are representative of the subsurface geological formations.

Those in the art will appreciate that there may be variations on the scenario described immediately above. For example, in marine surveys, the seismic signals usually are not imparted directly into the ground. The seismic sources are usually towed on the water's surface so that they first travel through the water column to the ground surface before they then enter the ground. Sometimes the returned energy must travel through the water column to be received and recorded. Nonetheless, in all these variations, the basic paradigm in which seismic signals are imparted into the ground, travel through the subsurface formation, are returned to the ground's surface, and recorded is consistently observed.

All of this takes place because the subsurface geological formation cannot, as a practical matter, be directly observed at the desired scale. For the analysts to indirectly "observe" the subsurface geological formations, the raw seismic data are "imaged", or processed to produce an image of the subsurface geological formations. Those in the art will appreciate that there are many ways to process and many ways to image the raw seismic data depending on the end use of the image and in what the analysts are interested.

One of the things on which the accuracy of the analysis depends is the quality of the image. This can become more of a concern when the imaged formations are particularly complex or for other reasons are poorly illuminated by the seismic signal's energy. One of the factors that makes current seismic exploration efforts so challenging is that many of the formations of interest are not only in locations difficult to reach and survey, but also include complex formations that are difficult to illuminate due to strong subsurface heterogeneities surrounding the formations.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Figure 1:
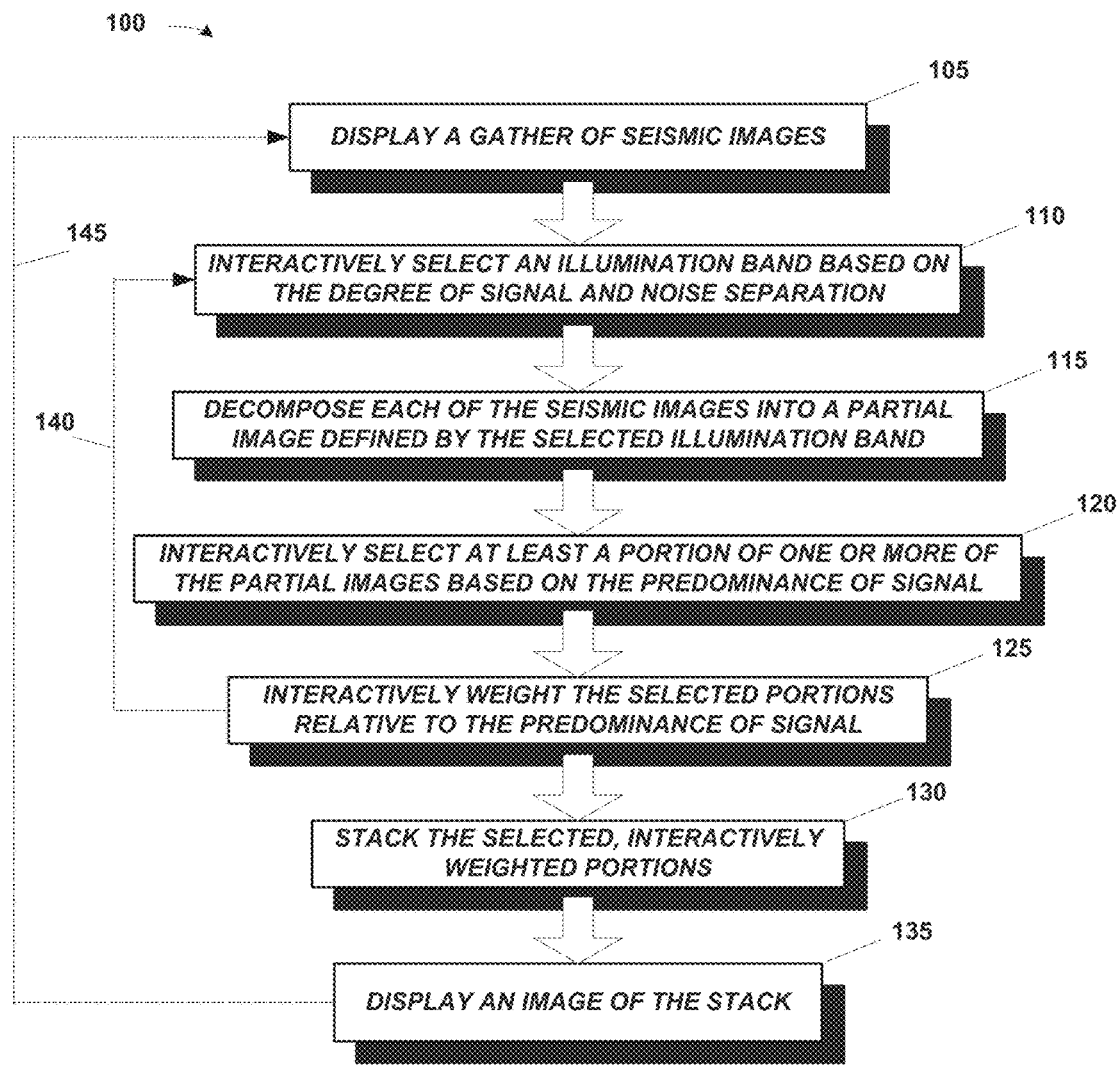
FIG. 1 is a flow chart of an particular embodiment of the method of the presently disclosed technique.

The presently disclosed technique may be referred to as Interactive Image Weighting by Illumination ("IIWI"). It is an interactive tool allowing users to design and apply various types of weighting schemes to seismic images based on illumination analysis to improve the image quality of the final stack. A "stack" is the end result of a "stacking" process by which seismic traces from different seismic records that have a common reflection point are summed. The stacking process reduces noise in the final stack and improves overall data quality. The presently disclosed subject matter still further improves data quality in the "final" stack over and above the stacking process by eliminating noise from the seismic record prior to stacking.

The technique disclosed herein, then, provides that various illumination bands in a gather of seismic images are interactively selected by a user, and corresponding partial images are generated and examined on-the-fly, to identify the illumination bands that carry most of the useful signal and allow the most effective signal-noise separation (i.e., the remaining noise is localized and can be easily removed). Various weighting functions can be designed to remove the localized noise from the identified illumination-band images. This can be done, for example, by designing spatial varying muting polygons to mute out the noise in the images. Because of the interactive feature of the method, the effects of the operations (illumination band selection, weighting function design, etc.) are seen almost instantly, this allows testing of multiple possible scenarios to achieve the most satisfactory result for the final image stack.

Interactive Image Weighting by illumination ("IIWI") therefore is an interactive seismic processing tool for designing an illumination-based weighting scheme used to weight and stack seismic images, improving the quality of the final stacked image. IIWI follows the basic idea of illumination weighting but, rather than applying the illumination weighting solely on the angle image gathers, generalizes the concept to any type of image gathers as long as the corresponding illuminations consistent with the input image gathers are provided. For example, IIWI can use shot image gathers as an input, together with associated "source-side" illuminations produced directly during the shot migration, thus eliminating a separate illumination prediction step as required in previously known approaches.

Yet another conceptual difference from known approaches is that IIWI uses the illumination to decompose images into individual illumination bands—that is, images become functions of illumination. This provides more efficient noise/signal separation to design appropriate weighting and stacking schemes achieved by means of visual inspection of the results produced on-the-fly.

The technique described herein therefore is interactive and the results are obtained in real-time, thereby allowing testing for various scenarios. IIWI will be most beneficial when used in a complex, poorly and unevenly illuminated subsurface. Exemplary of such a subsurface are the subsalt formations being extensively surveyed. In such environments, the resulting IIWI images are often cleaner and of better quality than conventional stacks. Several alternative IIWI image stacks can be also provided, which could be desirable for seismic interpretation.

The concept behind IIWI is very general and flexible. IIWI can be applied to any kind of seismic image gathers (angle, dip, shot, VOO, etc.), and can use various types of associated illuminations (source-side, model-predicted, data-extracted, etc.) and weighting schemes. The user-defined illumination band selection and spatially-varying weighting design, in combination with its interactive nature, give the technique substantial flexibility for users to design an effective weighting scheme to improve the stacked image quality.

The technique disclosed and claimed herein first decomposes the input images into partial images corresponding to various user-defined illumination bands. Users then examine the partial images and identify those that capture mostly useful signal, and the remaining noise can be separated and localized within them. Users then design appropriate weighting schemes to remove the localized noise from the partial images. A stack applying the scheme follows, enhancing the signal in the final stacked image. The process is interactive and the results are, in the embodiments illustrated herein, obtained in real time. (In other embodiments, results may be obtained in near real-time or even at some later point in time.) This allows the user to test various scenarios and provides several alternatives if desired.

More particularly, the input to the process is a set of seismic images (i.e., various types of image gathers) together with associated illuminations (previously obtained by a method of choice). During the IIWI process, the individual seismic images are first decomposed into partial images corresponding to various illumination strengths (i.e., each partial image depicts only that part of the subsurface that is illuminated within a given illumination strength/range of illuminations). Such an image decomposition (i.e., an image as a function of illumination strength) often results in a separation of signal from noise. A user can then visually select only those images (corresponding to those illumination strengths), or parts of those images, that contain mostly signal. This way, an appropriate weighting scheme of images can be designed to suppress the noise and enhance the signal in the final stack over all images available.

Reference will now be made in detail to the exemplary embodiments of the invention, an example of which is illustrated in the accompanying drawings wherever possible, the same reference numbers will be used throughout the drawings to refer to the same or like parts. Turning now to the drawings, FIG. 1 is a flow chart of one particular embodiment of the method of the presently disclosed technique. The presently disclosed technique, in one aspect, provides a method 100 for use in seismic imaging a subterranean geological formation. The method 100 begins by displaying (at 105) a gather of seismic images. In one embodiment discussed further below, this includes displaying each seismic image and its respective illumination individually. In another embodiment also discussed further below, the seismic images are first stacked and then displayed in the form of the stack. The seismic images and illuminations, where used, are generated from a set of seismic data representative of the geological formation that is being imaged.

The method 100 then continues by interactively selecting (at 110) an illumination band based on the degree of signal and noise separation in the seismic images. The flow of this interactive selection (at 110) may depend to some degree on the implementation of a given embodiment. For example, in the embodiment in which the seismic images and their respective illuminations are individually displayed, the illumination band may be interactively selected in the illumination of each displayed seismic image of the gather based on the degree of signal and noise separation in the respective seismic image. On the other hand, in the embodiment in which the seismic images are first stacked, then the illumination band is interactively selected from the stack of the gather of the seismic images based on the degree of signal and noise separation in the stack.

Once the illumination band is selected (at 110) the method begins by decomposing (at 115) each of the seismic images of the gather into a partial image, each partial image being defined in the seismic image by the selected (at 105) illumination band. At least a portion of each partial image is then interactively selected (at 120) based on a predominance of signal in the partial image and then interactively weighted (at 125) relative to the predominance of signal. That is, within each partial image, a portion exhibiting a high predominance of signal relative to noise is selected and weighted for its desirability for inclusion in the rest of the process. Each of the decomposition (at 115), portion selection (at 120), and weighting (at 125) may be iterated in some embodiments with additional illumination bands as described below and indicated by ghosted arrow 140.

Upon completing the decomposition (at 115), portion selection (at 120), and weighting (at 125), the method 100 then stacks (at 130) the selected, interactively weighted portions. This is followed by displaying (135) an image of the stacked, weighted portions. This display has the advantage of permitting a use to view the result of the process and decide whether to iterate the process to obtain a more suitable image as indicated by the ghosted arrow 145. The displayed image is an image of the subterranean geological formation.

To further an understanding of the present invention, one particular embodiment will now be disclosed. The embodiments disclosed herein presuppose that the seismic data (not shown) has already been acquired. They also presuppose that some preprocessing has already been performed to obtain the seismic images 200 ("Sel") and their respective illuminations ("ILL") 205, both graphically represented in FIG. 2. It furthermore presupposes that the seismic images 200 and their respective illuminations 205 have previously been collected into respective gathers 215.

With respect to the seismic data from which the seismic images 200 are generated, virtually any type of seismic data may be used. Those in the art will appreciate that seismic data acquisition occurs in seismic surveys that are sometimes classified by the environment in which they are performed. One type of acquisition is known as "marine" seismic surveying, which occurs in aquatic environments including not only saltwater, but also fresh and brackish water. A second type is known as "land based" or "land" surveying and occurs on land. The third kind may be called a "transition zone" survey, which occurs in environments partially on land and partially on water. The presently disclosed technique is not limited by whether the seismic data are acquired using a marine, land based, or transitional zone survey.

Those in the art will also appreciate that seismic data itself is sometimes described as, for example, two-dimensional ("2D"), or three-dimensional ("3D") depending on the design of the acquisition. (The design affects the subterranean coverage of the survey so that it is, for example, 2D or 3D.) There is also a four-dimensional ("4D") seismic data type in which 3D data are taken in at least two different surveys separated in time, time being the fourth dimension. The embodiments illustrated herein are applied to seismic images 200 and illuminations 205 derived from 2D data but the disclosed technique is equally applicable to 2D, 3D, and 4D seismic data.

The seismic image gathers 200 themselves may be any type of seismic image known to the art. A "seismic image", as that term is used herein, is a representation of the subsurface generated from seismic data obtained from that subsurface. It is well known in the art how to generate such seismic images 200 by the process known as migration and they usually constitute what is known as "image gathers" (or shortly "gathers"). The seismic data are digitizations of seismic traces recorded by seismic receivers, the seismic traces being measurements of incident energy levels over time. The collected seismic data, prior to migration, may be collected into various (data) "gathers", such as common shot/common receiver/common midpoint gathers, etc., as are well known in the art. The (image) gather 215 may be produced using any suitable gathering technique known to the art.

The "illuminations" 205 are data sets representative of the energy distributions of the seismic signal's energy that produces the seismic data. Those in the art will appreciate that as the energy propagates through the subsurface, it interacts with the subsurface and that these interactions determine the further propagation of that energy. Perhaps the energy encounters a boundary that reflects a part of the energy while the rest continues onward. Or perhaps the boundary refracts the wavefront so that none of the energy is reflected, but splits into two different, forward directions.

This process yields what is known as "illumination". The "illumination" as used herein is a time-independent quantity that describes the spatial distribution of energy propagating in the subsurface over recorded time. The Illumination can be computed and assembled in a collection of ordered data that map onto the seismic images to define the energy intensity of that particular seismic image at that point.

Figure 2:
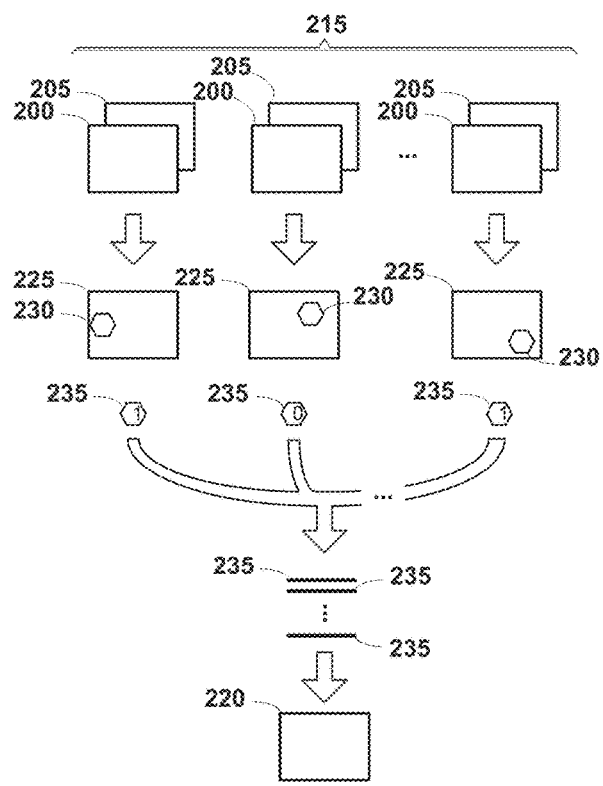
FIG. 2 graphically presents the workflow of the chart in FIG. 1.

Note that each seismic image 200 is associated with only a single, respective illumination 205 as is shown in FIG. 2. That is because a different illumination will yield a different seismic image 200 for the same subsurface. Thus, in this context, a seismic image 200 is "associated with" an illumination 205, and vice versa, in the sense that the illumination 205 is the one that produced the seismic data from which the seismic image 200 is generated. Similarly, each seismic image 200 is associated with a "respective" illumination 205—i.e., the illumination 205 that corresponds to the seismic image 200.

The techniques by which the seismic images 200 and their respective illuminations 205 are generated are well known in the art. The illuminations 205 are generated in the same process by which the seismic images 200 are generated. However, not all seismic imaging processes will generate both a seismic image 200 and an illumination 205. Some will be limited to generating seismic images 200 only. Accordingly, the seismic images 200 may be the product of any seismic imaging technique known to the art that also generates the associated illuminations 205 as well. One such technique is migration, as is mentioned above.

Furthermore, some embodiments may wish to employ illuminations that are more complicated (i.e., depending on more variables) that cannot be generated solely by a conventional migration. Then, some steps additional to the migration are employed. For example, one approach extracts/estimates illumination, including finite-difference modeling, together with the migration. The modeling is used because this approach is trying to predict more complex illumination function—not only the illumination as a function of a given source but also as a function of an opening angle and azimuth. Yet another way of extracting illumination, for example, is by interrogating statistical properties of the image itself. In that case, a suite of statistical tools is used together with the migration.

This approach is not limited to these extraction principles. There may be other ways of extracting illuminations suitable for the task. However, regardless of how the illuminations are extracted, the image will play some role in the process so that the illumination is related to, or associated with, that particular image. IIWI is otherwise independent of how the illumination is extracted. Additional information regarding this approach may be found in, for example, U.S. Pat. No. 8,553,499 if desired.

The process of generating seismic images 200 and illuminations 205, however, will include at least the migration, which is parameterized the same way as when used to generate the image itself. (This is the reason the illumination is associated with the image.)

Figure 3:
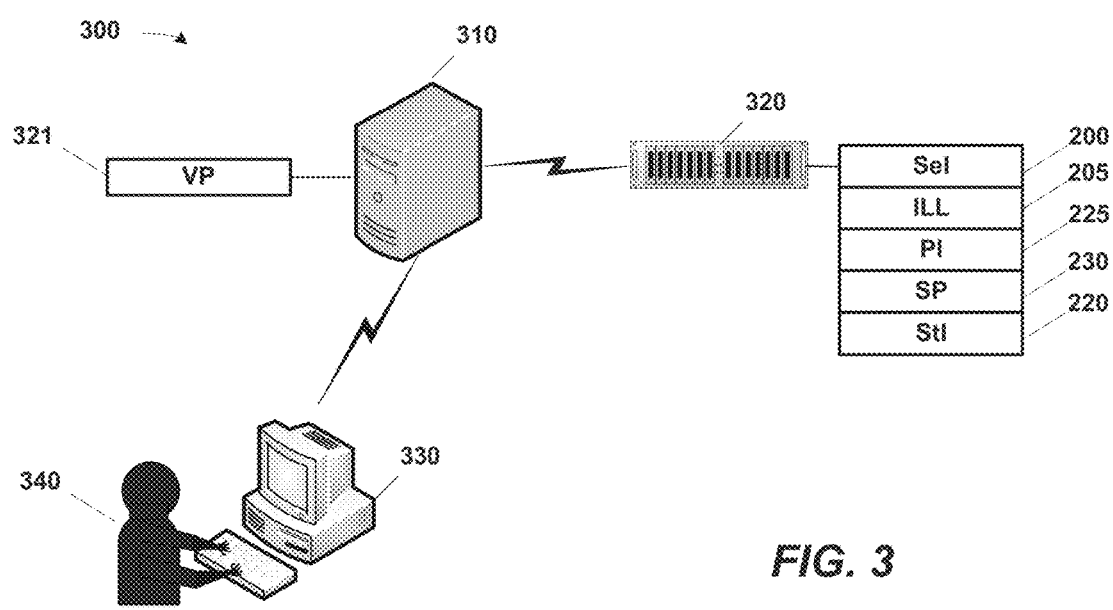
FIG. 3 depicts one particular embodiment of a computing apparatus as may be used in some aspects of the embodiment in FIG. 2.
Figure 4:
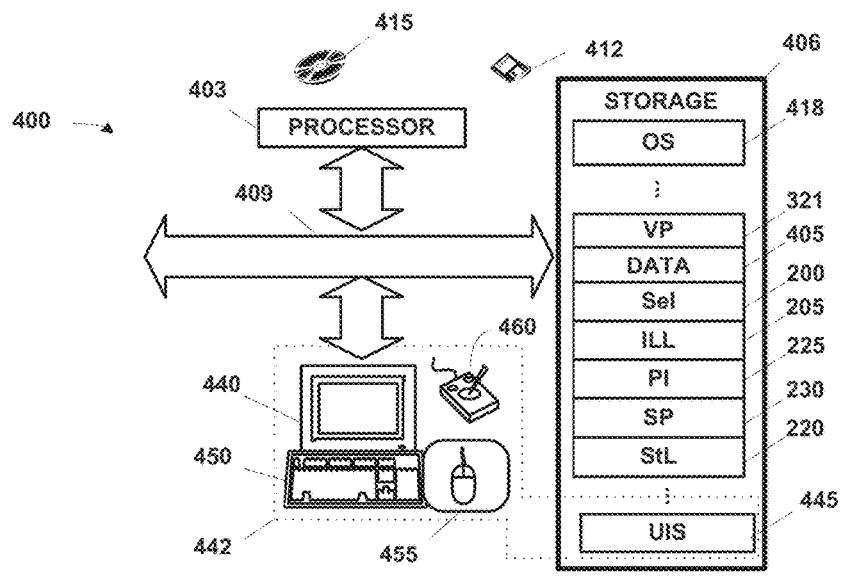
FIG. 4 illustrates selected aspects of a hardware and software architecture of a computing apparatus such as may be used in some aspects of the presently disclosed technique.

Those in the art will recognize from the above discussion of such things as "gathers" and "stacks" that some aspects of the presently disclosed technique are computer-implemented. FIG. 3 depicts a portion of a computing system 300 such as may be used in the embodiments disclosed herein. The computing system 300 is networked, but that is not required. Alternative embodiments may employ, for instance, a peer-to-peer architecture or some hybrid of a peer-to-peer and client/server architecture. The size and geographic scope of the computing system 300 is not material to the practice of the invention. The size and scope may range anywhere from just a few machines of a Local Area Network ("LAN") located in the same room to many hundreds or thousands of machines globally distributed in an enterprise computing system communicating over the Internet.

The computing system 300 comprises, in the illustrated portion, a server 310, a mass storage device 320, and a workstation 330. Each of these components may be implemented in their hardware in conventional fashion. Alternative embodiments may also vary in the computing devices used to implement the computing system 300. Those in the art will furthermore appreciate that the computing system 300, and even that portion of it that is shown, will be much more complex. However, such detail is conventional and shall not be shown or discussed to avoid obscuring the subject matter claimed below.

In FIG. 3, a visualization platform ("VP") 321 is shown residing on the server 310 while data structures for the seismic images ("SeI") 200 and illuminations ("ILL") 205 are shown residing in the mass storage 320. While this is one way to locate and distribute the various software components, the technique is not dependent upon such an arrangement. Although performance concerns may mitigate for certain implementation specific locations in particular embodiments, the situs of the software components is otherwise immaterial.

The visualization platform 321 is a tailored software application comprising a suite of interacting software tools used to image, analyze and otherwise exploit previously acquired seismic data or different kinds of seismic images derived from such seismic data for a variety of purposes. Sometimes the term "visualization platform" may be used also to reference a computing device programmed with a visualization platform or through which a visualization platform on another computing device may be accessed. For present purposes, it will be used to describe the software application.

Visualization platforms are well known to the art. There are several commercially available off the shelf visualization platforms available from a number of vendors well known to the art and locatable on the Internet, among other places. These visualization platforms may be modified to perform as described herein. The modifications to achieve that purpose will be apparent to those skilled in the art having the benefit of this disclosure and will be within their ability to readily implement or have implemented.

Returning now to FIG. 1, the method 100 is a method for use in seismic imaging of a subterranean geological formation. The end result of the method 100 is a stacked image ("StI") 220, shown in FIG. 2. Those in the art will appreciate that stacked images are put to many uses and that those uses sometimes dictate the processing of the images to be stacked as well as the input images. These same considerations govern the selection and generation of the seismic images 200 in the presently disclosed technique for input into the method 100.

Referring now to FIG. 1-FIG. 3 collectively, the user 340 invokes the visualization platform 321 from the workstation 330 to perform the method 100. The method 100 begins by displaying (at 105) a gather 215 of seismic images 200 with their respective illuminations 205. The seismic images 200 and illuminations 205 are generated from a set of seismic data (not shown) representative of the geological formation (also not shown) as described above. The actual displaying is performed by the workstation 330 under the control of the visualization platform 321 at the direction of the user 340.

Those in the art will appreciate that in any seismic image 200 there will be both signal and noise. In this context, "signal" is data containing information regarding the subsurface under investigation and generally originates from the seismic signal by which the seismic data are acquired. (The effect of the subsurface on such seismic signals is also evidenced in the "signal".) In this sense, the "signal" and the data derived therefrom are representative of the subsurface through which they travel. Conversely, "noise" is data that is not representative of the subsurface. Noise originates from many sources and is typically undesirable. Those in the art will find the presently disclosed technique useful in reducing the noise in stacked images.

The user 340 then interactively selects (at 110) an illumination band in the illumination 205 of each displayed seismic image 200 of the gather 215, wherein the illumination band is based on the degree of signal and noise separation. The selected illumination band will exhibit good signal and noise separation. In the illustrated embodiment, each seismic image 200 is displayed to the user 340 with its respective illumination 205 mapped onto the display. A slider bar in the user interface (not shown) is used to navigate through the range of illuminations. More particularly, as the user 340 translates the slider bar, pixels whose intensities are not selected by the slider bar are suppressed or muted.

The user 340 examines the displayed seismic image 200 for the separation of noise and signal. The selective illumination permits the user 340 to more readily identify areas of good separation within the displayed seismic image 200. The degree of desired separation will be an implementation specific detail depending primarily on (1) the intended use of the resultant stacked image 220 and (2) the quality desired for the stacked image 220 in light of that intended use, and (3) the computational and economic cost of the effort. Note that these factors are not exclusive and that other factors may come into play in alternative embodiments. Those in the art having the benefit of this disclosure will appreciate how these factors interplay and accommodate those considerations.

It is furthermore a subjective evaluation on the part of the user 340. Those in the art acquire the skill and judgment underlying such a subjective evaluation through experience over time. The user 340 may also collaborate with colleagues whose input is deemed useful or desirable. There may even be a collective determination regarding what areas of the displayed seismic images 200 are of interest because of the quality of noise and signal separation. However, because the evaluation is subjective, the outcome may vary depending on the skill and judgment exercised in the determination.

The illumination band (not shown) is defined by first and second energy intensities selected by the user 340. The selection of these intensities is based on the subjective evaluation of the quality of signal and noise separation discussed above. The narrowness or breadth of the range will be a function of which energy intensities yield desirable separation. The selection may be communicated to the visualization platform 321 in any suitable manner in light of the user interface. So, depending on the user interface the selection may be communicated by tapping on a touchscreen, or clicking with a mouse, or even manual entry into dialog boxes.

Figure 5:
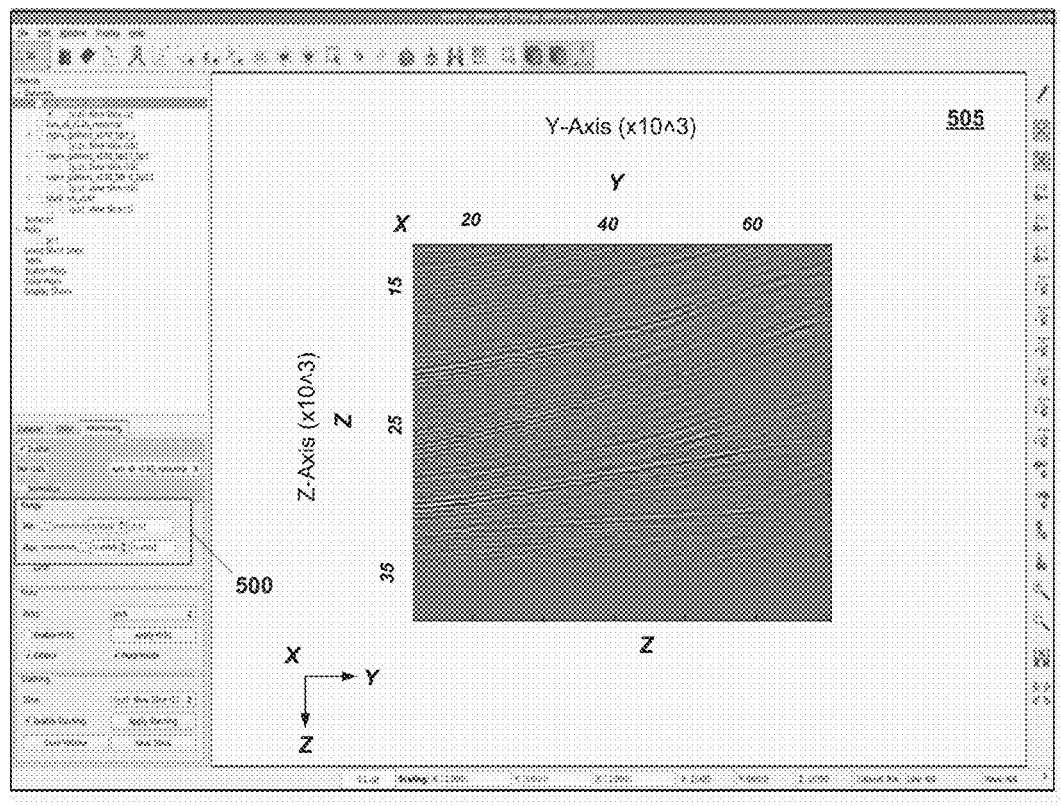
FIG. 5 depicts one particular graphical user interface as may be used in some embodiments to implement some aspects of the presently disclosed technique.

In the illustrated embodiment, as shown in FIG. 5, the user 340 manipulates the slider bar 500 in the viewing panel 505 of a graphical user interface 510. The user 340 clicks on the displayed seismic image 200 at the first intensity at which good signal and noise separation is encountered. The user 340 then continues manipulating the slider bar 500 until the separation falls below what is desirable whereupon the user 340 clicks the screen again. The visualization platform 321 then records the illumination band selected for the displayed seismic image 200 for use in the subsequent image decomposition. This process is repeated for each seismic image 200 in the gather 215.

As noted above, the selected illumination band will be the range of illumination intensities in the displayed seismic image 200 that exhibit "good" signal and noise separation. What is "good" is a subjective evaluation of the interpreter (the "user" will typically be a person known as an "interpreter") using the presently disclosed and claimed technique. Essentially, "good" is what is "good enough" for the seismic purpose of the final, stacked image in the opinion of the user. More objectively, it is the point at which the interpreter feels they can see the signal dominating enough over the noise.

For example, in one embodiment, "good" signal noise separation means the signal and the noise are not overlapped on each other spatially within in a particular illumination band. The signal may vary depending on the seismic purpose. Sometimes it is a coherent and continuous event if the seismic purpose is looking for a reservoir. But sometimes it is a discontinuity if looking for a fault. But, in any case, the "good" separation should allow users remove the noise without damaging the signal.

The user is looking for an illumination band in which signal can be found despite the fact that the signal may be otherwise invisible when looking at one single image corresponding to the entire illumination range. To identify the signal, the interpreter looks for some expected features that the signal would possess such as continuity of layers, certain expected dips, fault zones, etc. So what the interpreter considers to be signal may also be subjective.

Note that this user interaction may, as a practical matter, limit the number of seismic images 200 (and their associated illuminations 205) in the gather 215. It will take a finite period of time for each user 340 to examine and evaluate each seismic image 200. The amount of time available for this part of the process will therefore limit the number of displayed seismic images 200 that may be processed. However, there is no theoretical limitation and the size of the gather 215 is limited only by the amount of resources—both computational and human—one wishes to assign to the task.

The method 100, illustrated in FIG. 1, then decomposes (at 115) each of the seismic images 200 of the gather 215 into a partial image ("PI") 225 as depicted in FIG. 2. Each partial image 225 is defined in the respective seismic image 200 by the selected illumination band of the respective illumination 205. That is, the selected illumination band is used to identify which pixels (not shown) in the seismic image 200 are to be kept and which are to be muted or suppressed. Any pixel whose energy intensity (as mapped from the illumination 205 of the seismic image 200) falls outside the selected illumination band is suppressed or muted by the visualization platform 321. The result is a partial image 225 decomposed (at 115) from the seismic image 200.

The method 100 proceeds, as shown in FIG. 1, by interactively selecting (at 120) at least a portion ("SP") 230 of one or more of the partial images 225 based on the predominance of signal. The spatial separation of noise and signal will become more evident upon decomposition of the seismic images 200 into partial images 225 as described above. The user 340 can examine each of the partial images 225 and identify which, if any, portions 230 of those partial images 225 contain mostly signal relative to the noise.

What constitutes a sufficient amount of signal relative to noise is, again, a subjective determination by the user 340. The user 340 examines the displayed portions 230 for the presence of noise and signal. Whether any portion 230 contains a sufficient amount of signal relative to noise will be an implementation specific detail depending primarily on (1) the intended use of the resultant stacked image 220 and (2) the quality desired for the stacked image 220 in light of that intended use, and (3) the computational and economic cost of the effort. Note that these factors are not exclusive and that other factors may come into play in alternative embodiments. Those in the art having the benefit of this disclosure will appreciate how these factors interplay and accommodate those considerations.

It is furthermore another subjective evaluation on the part of the user 340. Those in the art acquire the skill and judgment underlying such a subjective evaluation through experience over time. The user 340 may also collaborate with colleagues whose input is deemed useful or desirable. There may even be a collective determination of the evaluation. However, because the evaluation is subjective, the outcome may vary depending on the skill and judgment exercised in the determination.

In the illustrated embodiment, the portions 230 are defined by an overlain pattern of polygons. Note that some embodiments may operate in higher dimensions and may generalize the polygons of the illustrated embodiments to polyhedrons. The user 340 can then indicate or select the polygon of interest through the user interface. So, depending on the user interface, the selection may be communicated, for example, by tapping on a touchscreen or clicking with a mouse. The illustrated embodiment employs a mouse and so the portion 230 of interest may be selected by clicking on it using the mouse. Alternative embodiments may employ many variations on the theme, however. Some embodiments may permit the user 340 to define their own portion 230 using a pointing device or by touching a touch screen, for example. Some embodiments may avoid such actions altogether by selecting the entire partial image 225 rather than some portion 230 thereof. That is, in some embodiments, the selected portion 230 may constitute the entire partial image 225.

The method 100, shown in FIG. 1, resumes by interactively weighting (at 125) the selected portions 230 relative to the predominance of signal. The weighting is a function of the predominance of signal in the subjective evaluation of the user 340 in light of implementation specific details such as (1) the intended use of the resultant stacked image 220 and (2) the quality desired for the stacked image 220 in light of that intended use, and (3) the computational and economic cost of the effort. Note that these factors are not exclusive and that other factors may come into play in alternative embodiments. Those in the art having the benefit of this disclosure will appreciate how these factors interplay and accommodate those considerations.

In the illustrated embodiment, a binary weighting system is used. If the user 340 decides that the selected portion 230 contains a sufficient amount of signal relative to noise, then it is assigned a weight of "1" which fully includes its content in the stacked image 220. Otherwise, the user 340 assigns it a weight of "0", which mutes or suppresses the selected portion 230 in the stacked image 220.

Alternative embodiments may use alternative weighting schemes, however, and any suitable weighting scheme known to the art may be used. For example, one may leave the selected portion 230 unweighted and then weight the remainder of the partial image 225 to a "0" to mute it. Or, alternatively, one may assign weights between "0" and "1" depending on the quality of the selected portion 230. Or, the partial image 225 may be assigned a weight of "1" and then those portions of the partial image 225 that are not selected—that is, are not a part of the selected portion—are assigned a weight of "0". Many such variations are possible and may be used in alternative embodiments.

The method 100 may then loop back to select additional illumination bands (at 110) as indicated by the ghosted line 140 or to process additional partial images as indicated by the ghosted line 145 until all desired partial images are processed. However, this looping may be omitted in some embodiments. For some illumination bands whose corresponding images are good enough (in the estimation of the user), the process 100 may skip steps 115-125 as is discussed further below. So effectively, the "loop over illumination" is equivalent to selecting bands (might be one or multiple) containing signal and separable noise, and then removing the noise in those bands using the process 115-125 in FIG. 1.

However, in this alternative embodiment, the final stack does require the illuminations that 1) are skipped because they only contain signal with no need to process; and 2) are processed to remove the noise. There are cases that some illumination bands are just full of noise, and these may be disregarded. This is directly equivalent to applying a weight of "0" to the entire domain of all partial images. So, the loop over illumination might be optional, but the final image is stacked over all the useful illumination bands, whether processed or unprocessed.

The method 100 then displays (at 135) an image of the stack, i.e., the stacked image 220, to the user 340. This provides the user 340 an opportunity to review and evaluate the stacked image 220 to see if it is suitable for their seismic purpose. Again, this is a subjective evaluation on the part of the user 340. If the user 340 is satisfied with the quality of the stacked image 220, then the process can be terminated.

However, in some embodiments, if the user 340 is not satisfied the method 100 can be repeated in whole or in part. For example, the user 340 may choose to go back and reweight (at 125) the selected portions 230 and restack them (at 130). Or, the user 340 may decide to scrap the selected portions 230, go back to the partial images 225, select new portions 230 (at 120), weight them (at 125), and stack them (at 130). Depending on the embodiment, the user 340 may go all the way back to the illumination band selection (at 110).

The processing of the imagery (at 115, 120, 125, 130, 135) is all performed in real time or in near-real time. This permits the user 340 to rapidly go through the process and try many iterations quickly. This, in turn, permits the user 340 to review many stacked images 220 before selecting one they think is best.

In embodiments in which various parts of the method 100 are iterated, different iterations will typically result in different stacked images 220. These stacked images 200 may furthermore be used for different seismic purposes. So, for example, a first iteration may employ a first set of partial images and obtain a first stacked image while a second iteration employs a second set of partial images and obtains a second stacked image. Thus, the first set of partial images may differ from the second set and the first stacked image may differ from the second stacked image. This difference may, in some embodiments, reflect the different seismic purposes for the first and second stacked images. Multiple iterations may also be used to address multiple scenarios and to further improve image quality.

Within this context, the seismic purpose may be practically any seismic purpose known to the art for which a stacked image might be used. For example, seismic images may be used for localization and characterization of hydrocarbon reservoirs. Seismic is the primary method used by those in the industry to "see through the earth" on the large scale and with the resolution needed. From seismic images and geology information, one can describe, for example, the geological evolution of the subsurface, identify potential hydrocarbon source rocks and migrating pathways of hydrocarbons through the subsurface, and predict locations of reservoir rocks and thus potential accumulations of hydrocarbons. Together, with some other data, one can often characterize the reservoirs (size, compartmentalization, fluid content and fluid viscosity, porosity, etc.). One can also use seismic images in a 4D sense—mapping changes in the subsurface over some period of time while the reservoirs are being produced. This may include, for example, monitoring fluid flow in the reservoir compartments, mapping shape changes (such as squeezing) of reservoirs and overburden rocks, etc. Seismic images may also be used to predict potential geo-hazards above the reservoirs to be drilled. Seismic images, in combination with other data, thus play a role in designing the plans for drilling and production of hydrocarbon reservoirs.

Some parts of the method 100 include "interactively" performing some act. The term "interactively" as used herein indicates an active interaction between the user and the computing apparatus through the user interface of the computing apparatus. Thus, "interactively selecting an illumination band" (at 110) is performed by the user rather than the computing apparatus. The same is true for the "interactively selection" (at 120) of the portions 230 and the "interactive weighting" (at 125) of the selective portions.

As is apparent from the description above that some aspects of the method are computer-implemented. To that end, FIG. 3 illustrates selected aspects of the hardware and software architecture of a computing apparatus such as may be used in some aspects of the presently disclosed technique. The computing apparatus 400 includes a processor 403 communicating with storage 406 over a communication medium 409. The illustrated hardware and software architecture may be distributed across a computing apparatus comprised of a plurality of computing devices. The computing system 300 is but one example of such a distributed hardware and software architecture.

The processor 403 may be any suitable processor or processor set known to the art. It will be appreciated that some types of processors will be preferred in various embodiments depending on familiar implementation-specific details. Factors such as processing power, speed, cost, and power consumption are commonly encountered in the design process and will be highly implementation specific. Because of their ubiquity in the art, such factors will be easily reconciled by those skilled in the art having the benefit of this disclosure.

Those in the art having the benefit of this disclosure will therefore appreciate that the processor 403 may theoretically be an electronic micro-controller, an electronic controller, an electronic microprocessor, an electronic processor set, or graphical processing units ("GPUs"). Some embodiments may even use some combination of these processor types.

In practice, however, seismic data sets and seismic imagery are quite voluminous and its processing is computationally intensive. Typical implementations for the processor 403 therefore actually constitute multiple electronic processor sets spread across multiple computing apparatuses working in concert. One such embodiment is discussed above. These considerations affect the implementation of the storage 406 and the communication medium 409 similarly.

The storage 406 may include a hard disk and/or random access memory ("RAM"), neither of which are shown. It may also include removable storage such as a floppy magnetic disk 412, an optical disk 415, or a thumb drive (not shown). These and any other suitable program storage medium known to the art may be used. Note that, to those in the art, program storage media are non-transitory.

Implementation-specific design constraints may also influence the design of the storage 406 in any particular embodiment. For example, as noted above, the disclosed technique operates on voluminous data sets which will typically mitigate for various types of "mass" storage such as a redundant array of independent disks ("RAID"). Other types of mass storage are known to the art and may also be used in addition to or in lieu of a RAID. As with the processor 403, these kinds of factors are commonplace in the design process and those skilled in the art having the benefit of this disclosure will be able to readily balance them in light of their implementation specific design constraints. The storage 406 may be distributed across multiple computing apparatuses as described above.

The storage 406 is encoded with a number of software components. These components include an operating system ("OS") 418; a visualization platform ("VP") 321; one of more data structures including the seismic images ("SeI") 200, and their illuminations ("ILL") 205. As the process is performed, the storage 406 will eventually become encoded with partial images ("PI") 225, selected portions ("SP") 230 of the partial images 225, and stacked images ("StI") 220.

The processor 403 operates under the control of the OS 418 and executes the visualization platform 321 over the communication medium 409. This process may be initiated automatically, for example upon startup, or upon user command. User command may be directly through a user interface. To that end, the computing system 400 of the illustrated embodiment also employs some kind of a user interface 442 Including user interface software ("UIS") 445 and a display 440. It may also include peripheral input/output ("I/O") devices such as a keypad or keyboard 450, a mouse 455, or a joystick 460. These will be implementation-specific details that are not germane to the presently disclosed technique.

Furthermore, there is no requirement that the functionality of the computing system 400 described above be implemented as disclosed. For example, the visualization platform 321 may be implemented in some other kind of software component, such as a daemon or utility. The functionality of the visualization platform 321 need not be aggregated into a single component and may be distributed across two or more components. Similarly, the data structure(s) may be implemented using any suitable data structure known to the art.

The implementation of the communications medium 409 will also vary with the implementation. If the computing system 400 is deployed on a single computing apparatus, the communications medium 409 may be, for example, the bus system of that single computing apparatus. Or, if the computing system 400 is implemented across a system of interfaced computing apparatuses, then the communications medium 409 may include a wired or wireless link between the computing apparatuses. Thus, the implementation of the communications medium 409 will be highly dependent on the particular embodiment in ways that will be apparent to those skilled in the art having the benefit of this disclosure.

Some portions of the detailed descriptions herein are presented in terms of a software implemented process involving symbolic representations of operations on data bits within memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or, alternatively, implemented over some type of transmission medium. Again, the program storage medium is non-transitory. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Those in the art may appreciate from the disclosure herein that the method 100 will become quite time consuming as the number of seismic images and illuminations increases. One particular approach to this conundrum is a second embodiment illustrated in FIG. 6-FIG. 7. In this particular embodiment, the display (at 605) of the gathers 715 includes stacking the gathers 715 and then displaying the stack 710. The user then interactively selects (at 610) from the displayed stack 710 rather than poring through each individual seismic image 200 and illuminations 205 as in the embodiment of FIG. 1-FIG. 2.

The decomposition (at 615) of the seismic images 200 into the partial images 725, interactive selection (at 620) of the portions 730, interactive weighting (at 625) of the selected portions are then performed as described above for the embodiment 100 in FIG. 1-FIG. 2. The selected interactively weighted portions 735 are then stacked (at 630) and the stacked image 720 is displayed to the user. As with the earlier embodiment, parts of the process may be iterated for multiple illumination bands as indicated by the ghosted line 640. Similarly, multiple iterations of the process may be performed as indicated by the ghosted line 645.

As it is apparent from the discussion above, the presently disclosed technique admits variation in the implementation of the interactive illumination band selection. A different implementation of the interactive illumination band selection distinguishes between the flow described in FIG. 1-FIG. 2 and FIG. 6-FIG. 7. In the later embodiment, the gathers 700 are loaded, together with their associated illuminations 705, into the visualization platform and then stacked to form a single image 710, which is then displayed as in FIG. 6 (at 605). The sliding bars 500, shown in FIG. 5, are then used by user 340 to scan over the illuminations 705 simultaneously. That is, the same sliding bar selection is applied to all illuminations 705 at the same time, simultaneously decomposing images 700 into their partial images, followed immediately by their stack. In this simultaneous scanning process the user 340 investigates the corresponding stacked image 710 as a function of illumination. This is the basis for the interactive selection of illumination band based on the degree of signal and noise separation in the stack 710 in FIG. 6 (at 610). This selection process differs from that in FIG. 1 (at 110), where the interactive selection of illumination band is performed not using a single stacked image but using each image 200 from the gather 215 separately and independently, i.e., the process is repeated as many times as is the number of images 200, implying more labor-intensive process.

Figure 6:
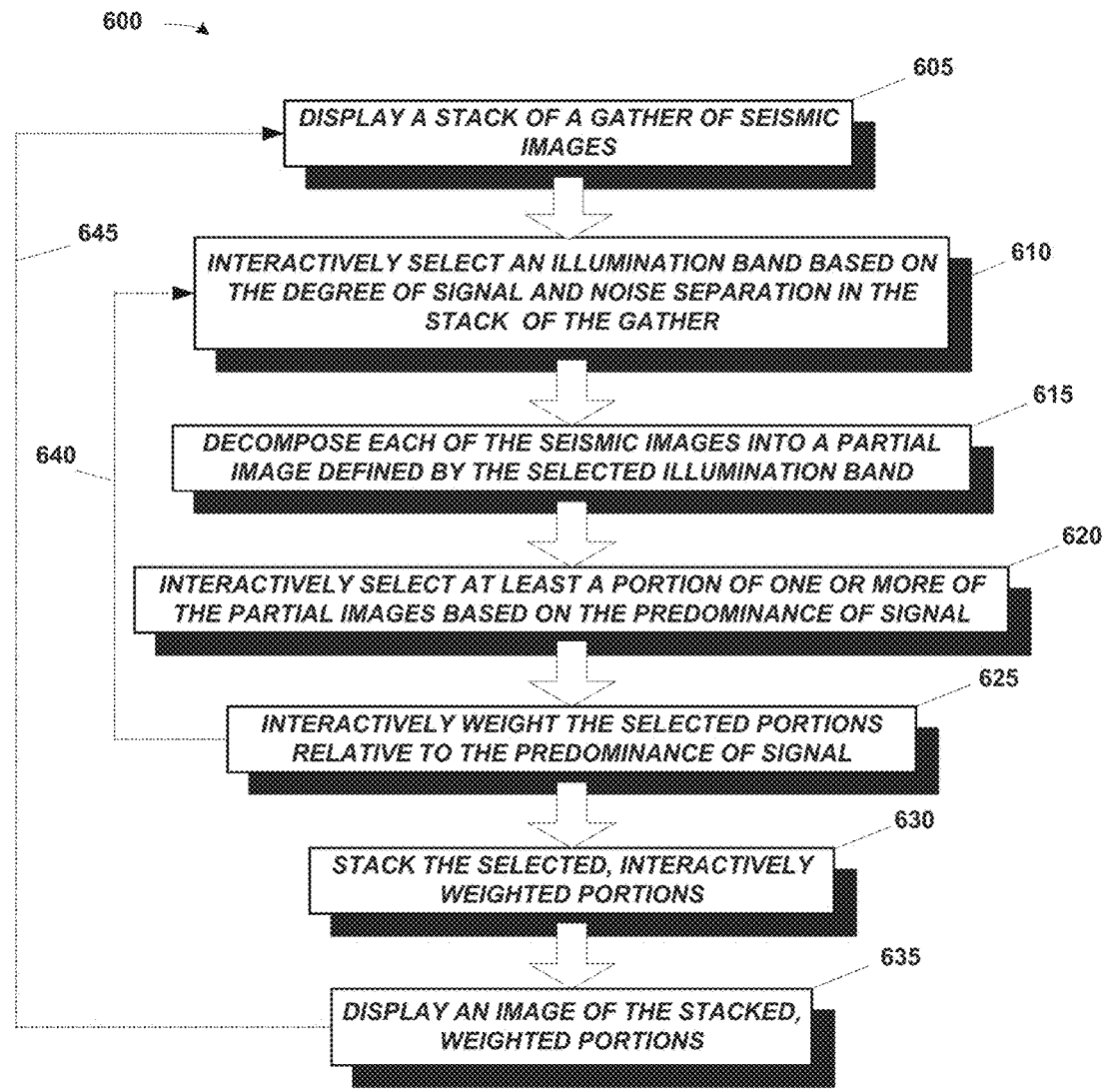
FIG. 6 is a flow chart of a second particular embodiment of the method of FIG. 1.
Figure 7:
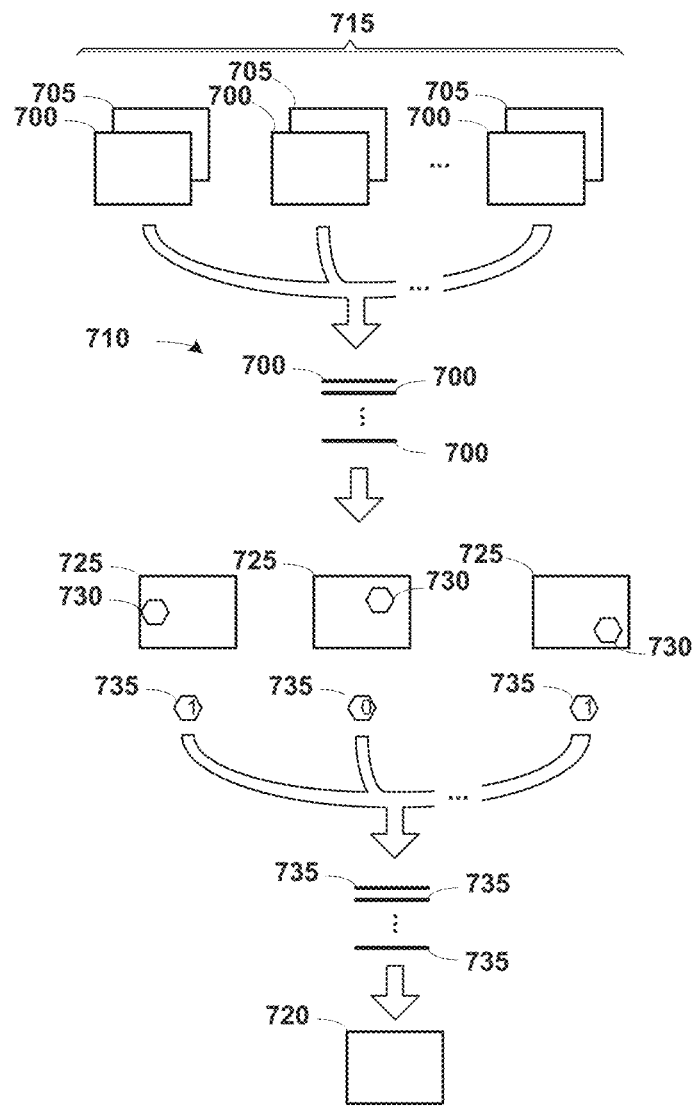
FIG. 7 graphically represents the workflow of the chart in FIG. 6.

Once the illumination band is interactively selected at 610, the rest of the flow described by FIG. 6-FIG. 7 is the same as that described by FIG. 1-FIG. 2. There may be more than one of such bands selected, depending on the degree of signal and noise separation in stack 710 over the entire illumination range revealed during the scanning process at 610. In such a case, the process loops as indicated by the ghosted line 640 and in the same manner as the loop 140 described in [0058]-[0059] above. The stack at 630 follows.

After the stack at 630 (or, alternatively, at 130), the flow may loop (at 645, or at 145) and repeat—e.g., to test a different scenario. Perhaps it is desirable to try a whole different set of illumination bands because the selection process described above is not unique and thus may not be the only plausible choice. Or perhaps some new information about the subsurface has become known so the process can be better steered with this information on mind.

Other embodiments of the invention will be apparent to those skilled in the art from consideration of the specification and practice of the invention disclosed herein. For example, those in the art having the benefit of this disclosure will realize that not all the steps must be performed in the order disclosed. One could also loop over seismic images on the input instead of the illumination bands. Then, they may choose one seismic image, decompose it into a set of partial images (each associated with a different illumination band), then select good parts of the partial images (using spatial polygons) and then (may partially stack them and) store them. This could then be repeated for another seismic image from the gather on input. In the end, though, both the illustrated process and this variant process stack all the stored results from all seismic images. Note also that not all embodiments will necessarily exhibit all the characteristics set forth above and, to the extent they do, they may not all manifest them to the same extent. It is intended that the specification and examples be considered as exemplary only, with a true scope and spirit of the invention being indicated by the following claims.

What is claimed is:

1. A method for use in seismic imaging a subterranean geological formation; comprising:
   displaying a gather of seismic images, the seismic images being generated from a set of seismic data representative of the geological formation;
   interactively selecting an illumination band based on the degree of signal-noise separation in the seismic images;
   decomposing each of the seismic images of the gather into a partial image, each partial image defined in the seismic image by the selected illumination band;
   interactively selecting at least a portion of one or more of the partial images based on a predominance of signal relative to noise;
   interactively weighting the selected portions relative to the predominance of signal relative to noise;
   stacking the selected, interactively weighted portions; and
   displaying an image of the stacked, weighted portions.

2. The method of claim 1, wherein displaying the gather of seismic images includes:
   stacking the gather of the seismic images; and
   displaying the stack of the gather of the seismic images.

3. The method of claim 2, wherein interactively selecting the illumination band includes interactively selecting an illumination band from the stack of the gather of the seismic images based on the degree of signal-noise separation.

4. The method of claim 1, wherein:
   displaying a gather of seismic images includes displaying a plurality of respective illuminations for the seismic images; and
   interactively selecting the illumination band includes interactively selecting an illumination band in the illumination of each displayed seismic image of the gather based on the degree of signal-noise separation.

5. The method of claim 1, further comprising iterating at least one of the interactively selecting the illumination band, the decomposing, the interactively selecting the portion, the interactively weighing, the stacking, and the displaying.

6. The method of claim 5, wherein:
   a first iteration employs a first set of partial images and obtains a first stacked image; and
   a second iteration employs a second set of partial images and obtains a second stacked image;
   wherein the first set of partial images differs from the second set and the first stacked image differs from the second stacked image.

7. The method of claim 1, wherein the gather comprises one of an angle gather, a dip gather, a shot gather, or a vector offset output gather.

8. The method of claim 1, wherein the image is an image of the subterranean geological formation.

9. A method for use in seismic imaging a subterranean geological formation, comprising:
   accessing a set of seismic data representative of the geological formation;
   generating a plurality of seismic images and a plurality of illuminations, each illumination being associated with a respective one of the seismic images from the accessed seismic data;
   generating a gather of the seismic images and their respective illuminations, wherein the gather comprises one of an angle gather, a dip gather, or a shot gather; and displaying the gathered seismic images and their respective illuminations, the displaying of each seismic image including the respective illumination for that seismic image;

selectively decomposing each one of a plurality of the seismic images into a partial image, each partial image defined in their respective seismic image by a previously selected range and intensity of the respective illumination;

interactively selecting at least a portion of a plurality of the partial images each portion being selected for the predominance of signal relative to noise:

interactively weighting the selected portions relative to the predominance of signal relative to noise; and stacking the selected, weighted portions.

10. The method of claim 9, further comprising iterating at least one of the interactively selecting the illumination band, the selectively decomposing, the interactively selecting the portion, the interactively weighing, the stacking, and the displaying.

11. A computer implemented method, comprising:
displaying a gather of seismic images with their respective illuminations, the seismic images and illuminations being generated from a set of seismic data representative of the geological formation;

receiving an input selecting an illumination band in the illumination of each displayed seismic image of the gather based on the degree of signal-noise separation;

decomposing each of the seismic images of the gather into a partial image, each partial image defined in the seismic image by the selected illumination band of the respective illumination;

receiving an input selecting at least a portion of one or more of the partial images based on the predominance of signal relative to noise;

iteratively:
receiving a plurality of inputs weighting the selected portions relative to the predominance of signal relative to noise;

stacking the selected, weighted portions; and displaying an image of the stack; and receiving an input selecting one of the stacks from the displayed stacked images.

12. The computer implemented method of claim 11, wherein:
a first iteration employs a first set of partial images and obtains a first stacked image; and a second iteration employs a second set of partial images and obtains a second stacked image;

wherein the first set of partial images differs from the second set and the first stacked image differs from the second stacked image.

13. The computer implemented method of claim 11, wherein the gather comprises one of an angle gather, a dip gather, a shot gather, or a vector offset output gather.

* * * * *